United States Patent
Chu et al.

(10) Patent No.: US 10,225,338 B1
(45) Date of Patent: *Mar. 5, 2019

(54) PEER TO PEER RANGING EXCHANGE

(71) Applicant: Marvell International Ltd., Hamilton (BM)

(72) Inventors: Liwen Chu, San Ramon, CA (US); Sagar Tamhane, Santa Clara, CA (US); Sarang Shrikrishna Wagholikar, Sunnyvale, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 633 days.

This patent is subject to a terminal disclaimer.

(21) Appl. No.: 14/687,705

(22) Filed: Apr. 15, 2015

Related U.S. Application Data

(60) Provisional application No. 62/113,216, filed on Feb. 6, 2015, provisional application No. 61/979,959, filed on Apr. 15, 2014.

(51) Int. Cl.
```
G01S 5/02       (2010.01)
H04L 12/24      (2006.01)
H04L 12/26      (2006.01)
H04L 29/08      (2006.01)
H04W 64/00      (2009.01)
H04W 84/18      (2009.01)
```
(52) U.S. Cl.
CPC .......... H04L 67/1042 (2013.01); H04L 41/12 (2013.01); H04L 43/0811 (2013.01); G01S 5/0289 (2013.01); H04W 64/00 (2013.01); H04W 84/18 (2013.01)

(58) Field of Classification Search
CPC .... G01S 5/0289; G01S 5/0027; H04W 64/00; H04W 84/18; H04W 8/005; H04W 4/02; H04W 4/023
See application file for complete search history.

(56) References Cited

U.S. PATENT DOCUMENTS

| | | | |
|---|---|---|---|
| 5,740,167 | A | 4/1998 | Taketsugu et al. |
| 7,512,089 | B2 | 3/2009 | Wybenga et al. |
| 7,515,945 | B2 | 4/2009 | Ruuska et al. |
| 7,535,884 | B2 | 5/2009 | Stephenson et al. |
| 7,599,346 | B2 | 10/2009 | Brommer |
| 7,814,322 | B2 | 10/2010 | Gurevich et al. |

(Continued)

OTHER PUBLICATIONS

Peer-to-Peer Technical Specification, Revision 1.0, Wi-Fi Alliance Peer-to-Peer Technical Task Group (2009) 43 pages.

(Continued)

*Primary Examiner* — David R Lazaro

(57) ABSTRACT

A method for discovering devices in a peer to peer (P2P) wireless communication network is described. During a search state of a first communication device, a probe request is transmitted by the first communication device on a first channel included in a plurality of channels. During the search state, a probe response transmitted by a second communication device on the first channel is received by the first communication device. In response to the probe response, a ranging exchange with the second communication device is performed by the first communication device.

21 Claims, 11 Drawing Sheets

(56) References Cited

U.S. PATENT DOCUMENTS

| | | | |
|---|---|---|---|
| 8,139,553 B2 | 3/2012 | Chang et al. | |
| 8,570,898 B1 | 10/2013 | Kopikare et al. | |
| 8,670,357 B2 | 3/2014 | Li et al. | |
| 8,886,833 B1 | 11/2014 | Kopikare et al. | |
| 8,892,722 B1* | 11/2014 | Kopikare | G06F 15/173 370/329 |
| 9,148,752 B2 | 9/2015 | Hart | |
| 9,198,119 B2* | 11/2015 | Venkatraman | H04W 48/16 |
| 9,456,306 B2 | 9/2016 | Wang et al. | |
| 9,775,007 B2* | 9/2017 | Wang | H04W 4/08 |
| 2002/0147819 A1 | 10/2002 | Miyakoshi et al. | |
| 2005/0053015 A1 | 3/2005 | Jin et al. | |
| 2005/0135286 A1 | 6/2005 | Nurminen et al. | |
| 2006/0126622 A1 | 6/2006 | Park et al. | |
| 2007/0171922 A1 | 7/2007 | Jabri et al. | |
| 2007/0237210 A1 | 10/2007 | Voglewede et al. | |
| 2007/0297352 A1 | 12/2007 | Jabri et al. | |
| 2008/0092204 A1 | 4/2008 | Bryce et al. | |
| 2009/0103501 A1 | 4/2009 | Farrag et al. | |
| 2009/0109946 A1 | 4/2009 | Morton et al. | |
| 2009/0310619 A1 | 12/2009 | Brommer | |
| 2010/0020746 A1 | 1/2010 | Zaks | |
| 2011/0010246 A1 | 1/2011 | Kasslin et al. | |
| 2011/0161697 A1* | 6/2011 | Qi | G06F 1/3209 713/320 |
| 2013/0036231 A1 | 2/2013 | Suumaki | |
| 2013/0065627 A1* | 3/2013 | Jung | H04W 76/15 455/515 |
| 2013/0250931 A1* | 9/2013 | Abraham | H04W 8/005 370/338 |
| 2014/0057670 A1* | 2/2014 | Lim | H04W 8/005 455/509 |
| 2014/0093005 A1 | 4/2014 | Xia et al. | |
| 2014/0152437 A1* | 6/2014 | Tian | G01S 5/02 340/539.14 |
| 2014/0160959 A1 | 6/2014 | Aldana et al. | |
| 2014/0187259 A1 | 7/2014 | Kakani et al. | |
| 2014/0206407 A1 | 7/2014 | Kim et al. | |
| 2014/0254422 A1* | 9/2014 | Mehta | H04W 8/005 370/254 |
| 2014/0282877 A1* | 9/2014 | Mahaffey | H04L 63/0853 726/3 |
| 2014/0295877 A1 | 10/2014 | Hart | |
| 2014/0335885 A1 | 11/2014 | Steiner et al. | |
| 2014/0368334 A1* | 12/2014 | Tian | G01S 5/0289 340/539.13 |
| 2015/0049716 A1 | 2/2015 | Gutierrez et al. | |
| 2015/0063138 A1 | 3/2015 | Aldana | |
| 2015/0063226 A1 | 3/2015 | Hsu et al. | |
| 2015/0063228 A1 | 3/2015 | Aldana | |
| 2015/0085669 A1 | 3/2015 | Prechner et al. | |
| 2015/0098460 A1* | 4/2015 | Wang | H04W 4/08 370/338 |
| 2015/0139212 A1 | 5/2015 | Wang et al. | |
| 2015/0139213 A1* | 5/2015 | Abraham | H04L 69/28 370/338 |
| 2015/0230283 A1 | 8/2015 | Li et al. | |
| 2015/0282230 A1 | 10/2015 | Kim | |
| 2015/0341892 A1 | 11/2015 | Aldana | |
| 2015/0365805 A1 | 12/2015 | Bajko et al. | |
| 2015/0365913 A1 | 12/2015 | Aldana | |
| 2015/0382152 A1 | 12/2015 | Lindskog et al. | |
| 2015/0382287 A1 | 12/2015 | Kim et al. | |
| 2016/0021495 A1 | 1/2016 | Segev | |
| 2016/0183057 A1 | 6/2016 | Steiner | |
| 2016/0183171 A1 | 6/2016 | Hareuveni et al. | |
| 2017/0115372 A1 | 4/2017 | Abinader, Jr. et al. | |

OTHER PUBLICATIONS

Wi-Fi Peer-to-Peer (P2P) Technical Specification, Revision 1.2, Wi-Fi Alliance Technical Committee P2P Task Group (2010) 159 pages.

Vegt, "Location MRD Submission on Wi-Fi Direct Based STA-STA FTM ranging," Wireless Network Management, Apr. 4, 2014—9 pages.

Notice of Allowance in U.S. Appl. No. 15/419,499, dated Nov. 3, 2017 (9 pages).

Non-Final Office Action of U.S. Appl. No. 15/419,499, dated Jun. 2, 2017 (12 pages).

Non-Final Office Action of U.S. Appl. No. 15/419,499, dated Jul. 20, 2017 (6 pages).

IEEE Std 80211™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

IEEE P1588™ D2.2 "Draft Standard for a Precision Clock Synchronization Protocol for Networked Measurement and Control Systems," The Institute of Electrical and Electronics Engineers, Inc., 2008.

IEEE Std. 1588™-2008 (Revision of IEEE Std. 1588-2002), "IEEE Standard for a Precision Clock Synchronization Protocol for Networked Measurement and Control Systems," The Institute for Electrical and Electronics Engineers, Inc., IEEE Standard, pp. 1-289 (Jul. 24, 2008).

IEEE Std. C37.238™-2011, "IEEE Standard Profile for Use of IEEE 1588™ Precision Time Protocol in Power System Applications," Institute for Electrical and Electronics Engineers, Inc., pp. 1-66 (Jul. 2011).

ITU-T Recommendation G.8265.1/Y.1365.1, "Precision time protocol telecom profile for frequency synchronization," Int'l Telecommunication Union, pp. 1-28 (Oct. 2010).

Aldana et al., IEEE P802.11—Wireless LANs, "CIDs 46,47,48 Regarding Fine Timing Measurement," The Institute of Electrical and Electronics Engineers, Inc., doc.: IEEE 802.11 11-12-1249-04-000m, pp. 1-17 (Jan. 2013).

Gurewitz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044 (2001).

Gurewitz et al., "One-Way Delay Estimation Using Network Wide Measurements," IEEE Trans. on Information Theory, vol. 52, No. 6, pp. 2710-2724 (2006).

Lee, "An Enhanced IEEE 1588 Time Synchronization Algorithm for Asymmetric Communication Link Using Block Burst Transmission," IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Mills et al., "Network Time Protocol Version 4: Protocol and Algorithms Specification," Request for Comments: 5905, Internet Engineering Task Force (IETF), pp. 1-111 (Jun. 2010).

Mills, "Internet Time Synchronization: The Network Time Protocol," Network Working Group Request for Comments, No. 1129, pp. 1-29 (Oct. 1989).

(56) References Cited

OTHER PUBLICATIONS

Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).

U.S. Appl. No. 15/419,499, Chu et al., "Peer to Peer Ranging Exchange," filed Jan. 30, 2017.

IEEE Std 802.11-REVmc™/D4.0, Jan. 2015 "Draft Standard for Information technology—Telecommunications and information exchange between systems—Local and metropolitan area networks—Specific requirements, Part 11: Wireless LAN Medium Access Control (MAC) and Physical Layer (PHY) Specifications," The Institute of Electrical and Electronics Engineers, Inc., pp. i-cii, 293-297, 340-344, 390-392, 765, 766, 814-816, 853-859, 895-897, 1050-1054, 11371140, 1538-1547, 1673-1676, 1709, 1710, 1734-1743, 2152-2154, 3565, 3566 (Jan. 2015).

Notice of Allowance in U.S. Appl. No. 15/419,499, dated Jan. 24, 2018 (9 pages).

\* cited by examiner

US 10,225,338 B1

PEER TO PEER RANGING EXCHANGE

CROSS-REFERENCES TO RELATED APPLICATIONS

This disclosure claims the benefit of U.S. Provisional Patent Application No. 61/979,959, entitled "Pre-GO Negotiation Range Measurement," filed on Apr. 15, 2014, and U.S. Provisional Patent Application No. 62/113,216, entitled "Pre-GO Negotiation Range Measurement," filed on Feb. 6, 2015. The disclosures of the applications referenced above are incorporated herein by reference in their entireties.

FIELD OF THE DISCLOSURE

The present disclosure relates generally to communication networks and, more particularly, to peer-to-peer wireless networks that utilize range measurement techniques.

BACKGROUND

An ever-increasing number of relatively inexpensive, low power wireless data communication services, networks and devices have been made available over the past number of years, promising near wire speed transmission and reliability. Various wireless technologies are described in detail in the IEEE 802.11 Standards, including for example, the IEEE Standards 802.11a, 802.11b, 802.11g, 802.11n, and 802.11ac, and their updates and amendments. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

When operating in an infrastructure mode, wireless local area networks (WLANs) typically include an access point (AP) and one or more client devices. When operating in an ad-hoc or peer-to-peer (P2P) mode, on the other hand, a dedicated AP is not required. Rather, in a P2P wireless network, a peer-to-peer group can be dynamically formed (e.g., independent of a fixed physical location) from a set of peer-to-peer-enabled wireless communication devices ("P2P devices"). One of the set of P2P devices operates as a P2P group owner of the P2P group, and the others in the set operate as P2P clients.

SUMMARY

In an embodiment, a method for discovering devices in a peer to peer (P2P) wireless communication network includes transmitting, by a first communication device during a search state of the first communication device, a probe request on a first channel included in a plurality of channels. The method also includes, receiving by the first communication device and during the search state, a probe response transmitted by a second communication device on the first channel. The method includes performing, by the first communication device and in response to the probe response, a ranging exchange with the second communication device.

In another embodiment, a first communication device includes a network interface device. The network interface device is configured to, during a search state of a first communication device, transmit a probe request on a first channel included in a plurality of channels. The network device is also configured to, during the search state, receive a probe response transmitted by a second communication device on the first channel. The network device is also configured to, in response to the probe response, perform a ranging exchange with the second communication device.

In an embodiment, a method for discovering devices in a P2P wireless communication network includes, listening, by a first communication device during an advertise state of the first communication device, for probe requests on a first channel included in a plurality of channels. The method includes transmitting, by the first communication device during the advertise state, a probe response to a first probe request transmitted by a second communication device on the first channel if the first probe request is received on the first channel during the advertise state. The method also includes, listening, by the first communication device during the advertise state and in response to the first probe request, for probe requests on the first channel and for a ranging request transmitted by the second communication device. The method includes, during the advertise state and in response to the ranging request, transmitting, by the first communication device, a first action frame having a dialog token for a fine timing measurement exchange, and storing, by the first communication device, a departure time indicator for the first action frame.

In another embodiment, a first communication device includes a network interface device. The network interface device is configured to listen for probe requests on a first channel included in a plurality of channels during an advertise state of the first communication device. The network interface device is also configured to, during the advertise state, transmit a probe response to a first probe request transmitted by a second communication device on the first channel if the first probe request is received on the first channel during the advertise state. The network interface device is also configured to listen, during the advertise state and in response to the first probe request, for probe requests on the first channel and for a ranging request transmitted by the second communication device. The network interface device is configured to, during the advertise state and in response to the ranging request, i) transmit a first action frame having a dialog token for a fine timing measurement exchange, and ii) store a departure time indicator for the first action frame.

DETAILED DESCRIPTION

There are a growing number of Peer-to-Peer (P2P) features for Wi-Fi, such as Wi-Fi Direct, neighborhood area network (NAN), Wi-Fi Serial Bus, Wi-Fi Display, Wi-Fi Docking, and others. For some features, it is desirable for a communication device to form a P2P group with other communication devices based on a range or distance between the communication devices. In an embodiment, for example, a print service on a communication device is configured to locate printers within a predetermined range or area. In another embodiment, a communication device such as a laptop computer automatically docks and/or undocks based on its range to another communication device, such as a docking station. In yet another embodiment, a communication device such as a smartphone provides home automation features, such as automatically unlocking doors or activating lights and appliances when a user, carrying the smartphone, approaches and is within a predetermined range.

In various embodiments and/or scenarios, communication devices perform a P2P discovery process that includes one or more of device discovery, service discovery, group formation, and range determination. Device discovery facilitates two P2P-enabled communication devices (hereinafter, "communication devices") arriving on a common communication channel and exchanging respective device information, such as a device name and device type. Service discovery is an optional feature that allows a communication device to discover available higher-layer services, such as a print service or display service, prior to forming a P2P group. A group formation procedure is used to determine which communication device will be a group owner (GO) for the P2P group and to form a new P2P group. After formation of the P2P group, the communication devices perform a ranging exchange to estimate the distance between them, for example, based on a "time of flight" calculation for exchanged messages. However, in some scenarios, a P2P group is formed although a range between the communication devices is inconvenient for a user, for example, when attempting to use a print service with a printer located on another floor of a building.

In some embodiments described below, a communication device is configured to perform a ranging exchange prior to formation of a P2P group. In at least some scenarios, determination of the range prior to formation of the P2P group can avoid or reduce delays in connecting to a suitable communication device for a desired P2P feature. In an embodiment, the communication device uses fine timing measurement (FTM) to provide a more accurate and stable estimation of distances between communication devices. In some embodiments, a communication device performs a ranging exchange based on various power save features. In an embodiment, for example, a communication device performs a ranging exchange to avoid interference with a notice of absence feature and/or an opportunistic power save feature.

Figure 1:
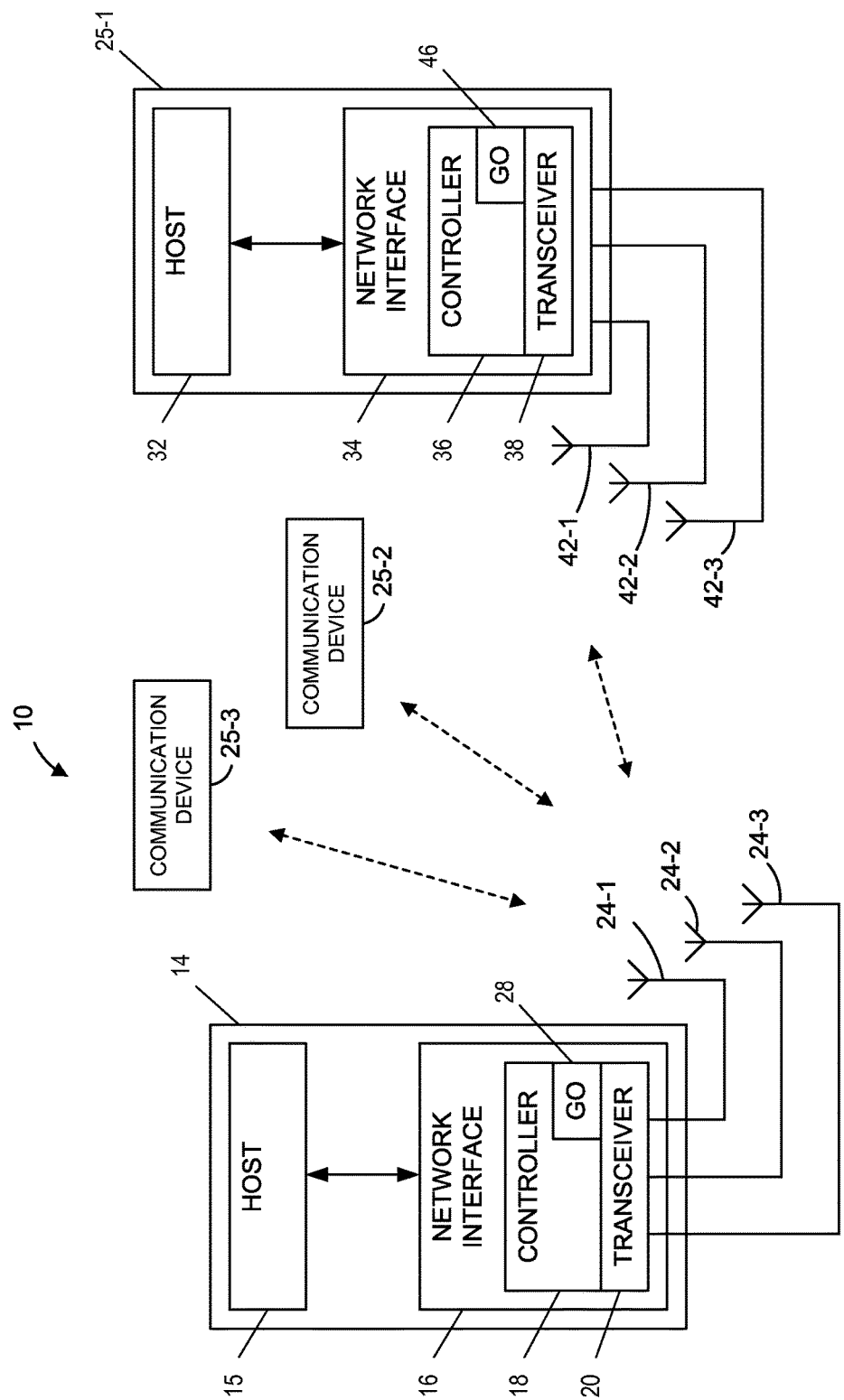
FIG. 1 a block diagram of an example peer-to-peer (P2P) wireless network, according to an embodiment.

FIG. 1 is a block diagram of an example peer-to-peer (P2P) wireless network 10, according to an embodiment. A communication device 14 includes a host processor 15 coupled to a network interface 16. The network interface 16 includes a controller 18 and a transceiver 20. The transceiver 20 is coupled to a plurality of antennas 24. Although three antennas 24 are illustrated in FIG. 1, the communication device 14 can include different numbers (e.g., 1, 2, 4, 5, etc.) of antennas 24 in other embodiments. In an embodiment, the controller 18 includes a group owner control unit 28. The group owner control unit 28 controls group owner functions when the communication device 14 acts as a group owner, in an embodiment. The group owner control unit 28 determines when the communication device 14 is to act as the group owner, in an embodiment.

The P2P wireless network 10 also includes a plurality of communication devices 25. Although three communication devices 25 are illustrated in FIG. 1, the P2P wireless network 10 can include different numbers (e.g., 1, 2, 3, 5, 6, etc.) of communication devices 25 in various scenarios and embodiments. A client device 25-1 includes a host processor 32 coupled to a network interface 34. The network interface 34 includes a controller 36 and a transceiver 38. The transceiver 38 is coupled to a plurality of antennas 42. Although three antennas 42 are illustrated in FIG. 1, the communication device 25-1 can include different numbers (e.g., 1, 2, 4, 5, etc.) of antennas 42 in other embodiments. In an embodiment, the controller 36 includes a group owner control unit 46. The group owner control unit 46 controls group owner functions when the communication device 25-1 acts as a group owner, in an embodiment. The group owner control unit 46 determines when the communication device 25-1 is to act as the group owner, in an embodiment.

In an embodiment, one or both of the communication devices 25-2 and 25-3 has a structure the same as or similar to the communication device 25-1. In these embodiments, the communication devices 25 structured like the client device 25-1 have the same or a different number of transceivers and antennas.

A P2P wireless network or "P2P group," such as the P2P wireless network 10 can dynamically form and dissolve as communication devices 14, 25 discover each other and leave the P2P network through time and space. Generally, P2P discovery occurs when a first P2P device (e.g., the device 14) advertises itself as P2P device, for example, by including an indication that the device 14 is a P2P device in a beacon frame, a probe request, a probe response, or some other P2P transmission. As used herein, the term "P2P device" refers to a device configured to operate according to a known P2P communication protocol that defines certain P2P communications such as beacon frames, probe requests and responses, etc. One example of such a P2P communication protocol is defined in Wi-Fi P2P Technical Specification v1.2, published by the Wi-Fi Alliance Technical Committee P2P Task Group. When another P2P device (e.g., the device 25-1) finds the first P2P device 14 (i.e., comes within range and detects the advertisement transmitted by the P2P device 14), the two P2P devices 14, 25-1 perform a procedure defined by the communication protocol and referred to as P2P group owner negotiation. The P2P group owner negotiation results in one of the devices being determined to have a P2P identity of a P2P group owner, and the other device being determined to have a P2P identity of a P2P client. Both the P2P group owner 14 and the P2P client 205 are associated with a P2P group identified by a basic service set identifier (BSSID). After a successful P2P group owner negotiation, the determined P2P group owner and P2P client begin an authentication procedure defined by the communication protocol to establish a P2P connection.

If other P2P devices 25-2, 25-3 discover the P2P wireless network 10 via one of the P2P group members 14, 25-1, the other P2P devices may join the P2P wireless network 10. Any suitable number of P2P clients can be associated with the P2P wireless network 10. In some cases, an addition of a new P2P device to the P2P group 202 can result in a change in P2P group ownership. At any time, an existing P2P client can disassociate itself with the P2P group 202, which may, in some cases, result in a change in P2P group ownership. In some embodiments, the P2P wireless network 200 includes more than one P2P group, and a P2P device can belong to more than one P2P group. In some embodiments, a P2P device can be a group owner in a first P2P group and a P2P client in a second P2P group simultaneously.

A P2P group owner (e.g., the device 14 of FIG. 1) generally manages the P2P wireless network 10. Unlike an infrastructure AP, however, P2P group ownership is not dedicated but is temporal. In particular, the device with which the P2P group ownership is associated can dynamically change over time and/or space. For example, if the current group owner—the device 14—leaves the P2P wireless network 10 (e.g., moves outside of range, powers off, etc.), the devices 25 perform group owner negotiation and determine a new group owner. In some embodiments, the P2P group owner provides one or more of Wi-Fi Protected Setup (WPS) internal registrar functionality, communication between P2P clients within the P2P wireless network 10, and access to another P2P group for clients within the P2P wireless network 10. In an embodiment, a determined P2P client implements WPS enrollee functionality.

In an embodiment, each of the P2P devices 14, 25 includes one or more configurations to support a complete set of P2P functionality, including P2P discovery, Wi-Fi Protected Setup (WPS), group owner negotiation, operation as a P2P client, operation as a P2P group owner, and other P2P functionality required by a P2P communication protocol. In an embodiment, the group owner control units 28, 46 each handles P2P group owner negotiation and P2P group owner functions.

Each communication device 14, 25 is, or is included in, for example, a general purpose computer, a portable computer (e.g., a laptop computer, a tablet computer, etc.), a video game console or gaming user device, a portable media device, a smart phone, a printer or other peripheral, a personal digital assistant, etc., according to some embodiments.

The host processor 15 is coupled to a host memory (not shown). According to an embodiment, the host processor 15 comprises a CPU (Central Processing Unit) and the host memory includes computer storage media in the form of volatile and/or nonvolatile memory such as read only memory (ROM), random access memory (RAM), FLASH memory, etc.

According to an embodiment, the host memory stores system data, such as identifying and/or manufacturing information. The host memory typically stores data and/or program modules that are immediately accessible to and/or presently being operated on by the host processor 15.

The network interface 16 enables connection to the P2P wireless network 10. In some embodiments, the network interface 16 comprises a Wi-Fi Alliance certified device. The transceiver 20 of the network interface 16 sends messages to and receives messages from other devices 25 in the P2P wireless network 10. In an embodiment, the controller 18 includes a processor that executes computer readable instructions stored in a memory (not shown) coupled to the host processor 15 or another memory (not shown) coupled to the processor.

The host processor 32 of the communication device 25-1 is coupled to a host memory (not shown). According to an embodiment, the host processor 32 comprises a CPU and the host memory includes computer storage media in the form of volatile and/or nonvolatile memory such as ROM, RAM, FLASH memory, etc. According to an embodiment, the host memory stores system data, such as identifying and/or manufacturing information. The host memory typically stores data and/or program modules that are immediately accessible to and/or presently being operated on by the host processor 32.

The network interface 34 enables connection to the P2P wireless network 10. In some embodiments, the network interface 34 comprises a Wi-Fi Alliance certified device. The transceiver 38 of the network interface 34 sends messages to and receives messages from other devices 14, 25 in the P2P wireless network 10. In an embodiment, the controller 36 includes a processor that executes computer readable instructions stored in the memory (not shown) coupled to the host processor 32 or another memory (not shown) coupled to the processor.

In some embodiments, at least some of the communication devices 14, 25 are configured to operate in one or more states, such as, for example, an advertise state, a scan state, a search state, and/or a negotiation state as described in U.S. Pat. No. 8,570,898, entitled "Method for Discovering Devices in a Wireless Network," filed on Oct. 26, 2009, which is hereby incorporated by reference.

In various embodiments, at least some of the communication devices 14, 25 are configured to perform a ranging exchange prior to formation of a P2P group. In some embodiments, the communication devices 14, 25 use timing measurement procedures (e.g., Institute for Electrical and Electronics Engineers (IEEE) 802.11-2012 Standard, Section 10.23.5) and/or fine timing measurement (FTM) procedures (IEEE 802.11mc) to provide a more accurate and stable estimation of distances between communication devices. For example, in an embodiment, the communication devices 14, 25 are "FTM capable" devices. In some embodiments, a group owner, such as the communication device 14, performs a ranging exchange based on various power save features, such as a notice of absence feature and/or an opportunistic power save feature. While the notice of absence feature and opportunistic power save feature are described separately in FIGS. 3 and 4 for clarity, in an embodiment, a communication device is configured to use both a notice of absence feature and the opportunistic power save feature in various scenarios.

In an embodiment, the communication device 14 detects another FTM capable device, such as the communication device 25-1. For example, in an embodiment, the communication device 25-1 includes an FTM capable indicator or "FTM capable bit" in a transmitted beacon frame. In response, the communication device 14 requests an FTM ranging exchange "As Soon As Possible," in an embodiment. Upon receipt of an action frame for the FTM ranging exchange, the communication device 14 estimates or derives a range between the communication device 14 and the communication device 25-1 from time indicators (e.g., timestamps) included in the action frames or corresponding acknowledgment frames.

In another embodiment, the communication device 14 is a group owner of a P2P group or Wi-Fi Direct group and detects another FTM capable device, such as the communication device 25-2. In this embodiment, for example, the communication device 14 requests an Extended Capability element in a Probe Request message and, if the communication device 25-2 is FTM capable, the communication device 25-2 provides a corresponding FTM capable indicator in a Probe Response message. If the communication device 25-2 is FTM capable, the communication device 14 requests the communication device 25-2 to commence and report FTM range measurements to the communication device 14, in an embodiment.

Figure 2:
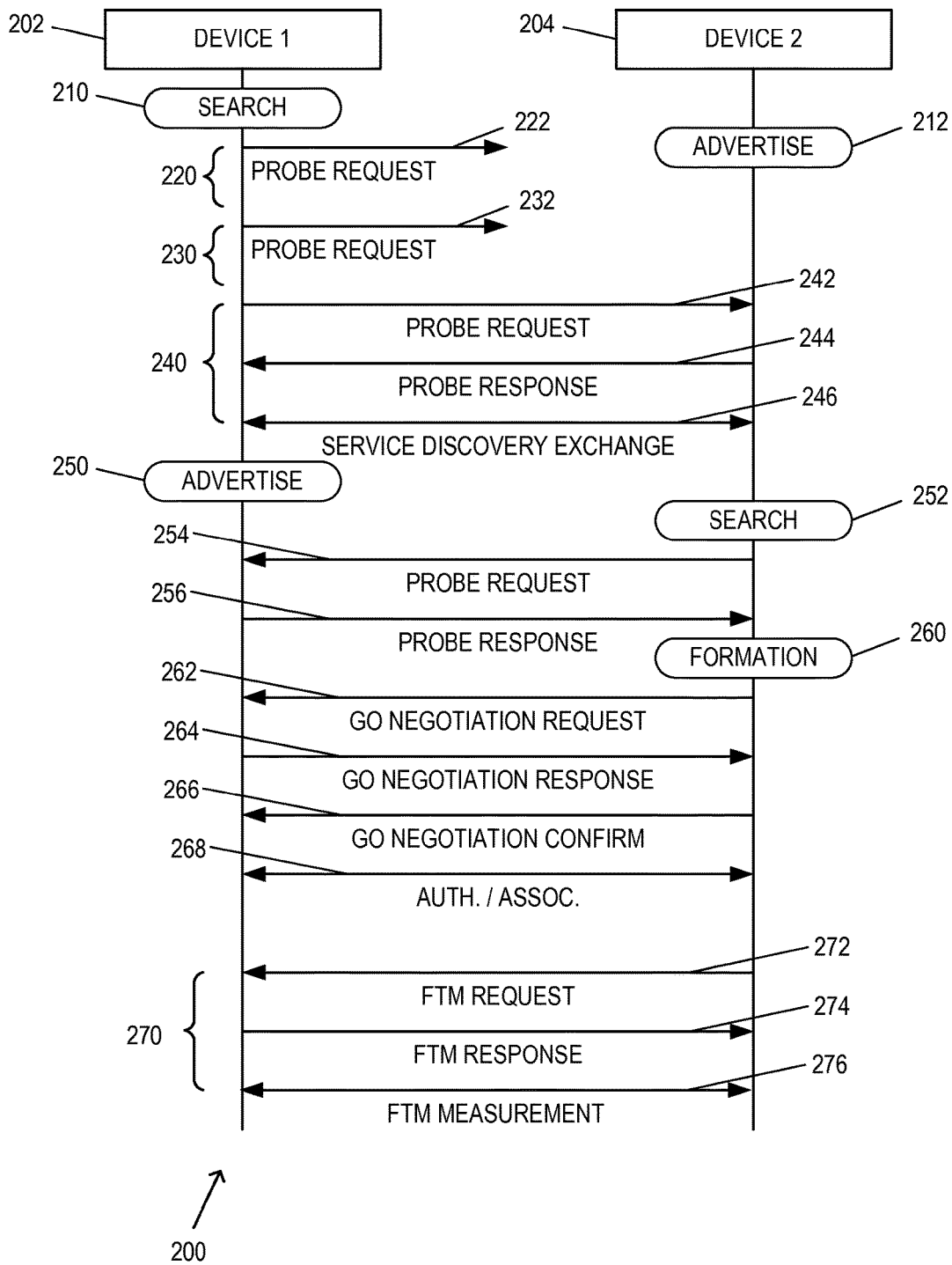
FIG. 2 is an example timing diagram illustrating two communication devices establishing a connection, according to the prior art.

FIG. 2 is an example timing diagram 200 illustrating two communication devices, a first communication device 202 and a second communication device 204, establishing a connection using a ranging exchange after group formation. In some embodiments, the first communication device 202 and the second communication device 204 are similar to the communication devices 14 and/or 25, described above with respect to FIG. 1. In other embodiments, the first communication device 202 and the second communication device 204 are other suitable communication devices.

In order for two communication devices to discover each other, the devices can toggle between an advertise state and a search state, in various embodiments and/or scenarios. In the advertise state, each communication device advertises its operating channel to other communication devices that are in a search state, in an embodiment. In the search state, a communication device sends signals known as probe requests on known channels (e.g., a "social channel"), in an embodiment. In various embodiments, probe requests are sent from a communication device to request information about another communication device. For example, in an embodiment, the communication device 202 sends a probe request using a social channel. In an embodiment, the probe request prompts other communication devices in the vicinity (e.g., the communication device 204) to transmit information such as the device type of the responding communication device and a parameter indicating a priority that the responding device be a master in a master-client relationship (sometimes referred to herein as a master intent value (MIV)).

In the embodiment illustrated in FIG. 2, the communication device 202 begins a search state 210 and performs one or more search procedures while the communication device 204 is in an advertise state 212. During the search state 210, the communication device 202 transmits a probe request 222 on a first channel 220 included in a plurality of channels, for example channel 6 of the non-over-lapping channels 1, 6, and 11 of the IEEE 802.11 standard, and listens for a corresponding probe response. In some embodiments and/or scenarios, the communication device 202 alternates between the social channels during the search state 210 and transmits additional probe requests 232 and 242 corresponding to channels 230 and 240, respectively. In the embodiment of FIG. 2, the communication device 204 listens on the social channel 240 and receives the probe request 242.

In response to the probe request 242, the communication device 204 sends a probe response 244 on the communication channel 240. In an embodiment, the communication device 202 initiates a service discovery exchange 246 with the communication device 204 after receipt of the probe response 244. For example, in an embodiment, the communication device 202 and communication device 204 exchange one or more communication frames that indicate a device type, physical layer (PHY) and/or media access control (MAC) layer capabilities, service capabilities, and/or other suitable information. In various embodiments, the communication of service capabilities allows a communication device to find a desirable P2P device to create a P2P group, for example, a P2P-enabled printer for a direct printing feature. In some scenarios, exchange of the service capabilities allows the communication devices to avoid a formation state and group ownership negotiation with P2P devices that do not offer the desired P2P service.

In some embodiments, the search state 210 and/or advertise state 212 are associated with respective timeout periods, for example, to cause the corresponding communication device to switch to another communication channel or to switch to another state. In various embodiments and/or scenarios, the timeout periods are randomly or pseudo-randomly selected. In the embodiment illustrated in FIG. 2, the first communication device 202 transitions to an advertise state 250 and the communication device 204 transitions to a search state 252. The communication device 204 transmits a probe request 254 on another communication channel (e.g., channel 1) and the communication device 202 responds with a probe response 256, in an embodiment. In response to the probe response 256, the communication device 204 transitions to a formation state 260, in an embodiment. In other embodiments, the communication device 204 initiates a service discovery exchange, as described above, prior to entering the formation state 260.

In the formation state 260, the communication device 204 transmits a GO negotiation request 262 to the communication device 202, in an embodiment. In response to the GO negotiation request 262, the communication device 202 transmits a GO negotiation response 264 to the communication device 204, which is then followed by a GO negotiation confirmation 266 to establish one of the communication devices 202 or 204 as the group owner, in an embodiment. The communication device 202 and communication device 204 then perform authentication and association 268 to form a P2P group, in an embodiment.

After GO negotiation and establishment of the P2P group, the first communication device 202 and second communication device 204 perform a ranging exchange 270, in an embodiment. The ranging exchange 270 includes a fine timing measurement (FTM) request 272 transmitted by the second communication device 204 to the first communication device 202. In response to the FTM request 272, the first communication device 202 transmits an action frame 274 or other suitable FTM responses to the second communication device 204. In some embodiments, the second communication device 204 transmits an acknowledgment (not shown) to each action frame 274. In some embodiments, the first communication device 202 and the second communication device 204 perform additional FTM measurements 276, such as transmission of additional action frames 274 and optional acknowledgments. In some embodiments, the second communication device 204 estimates a range to the first communication device 202 based on timing information for the action frames and acknowledgments, as further described below with respect to FIG. 7. Upon estimating the range, the communication device 202 or communication device 204 can determine whether to enable or use a P2P service. For example, if the range between the two communication devices is less than a predetermined value, a service can be activated to unlock a door (e.g., associated with the first communication device 202) by a mobile phone (e.g., the second communication device 204).

Figure 3:
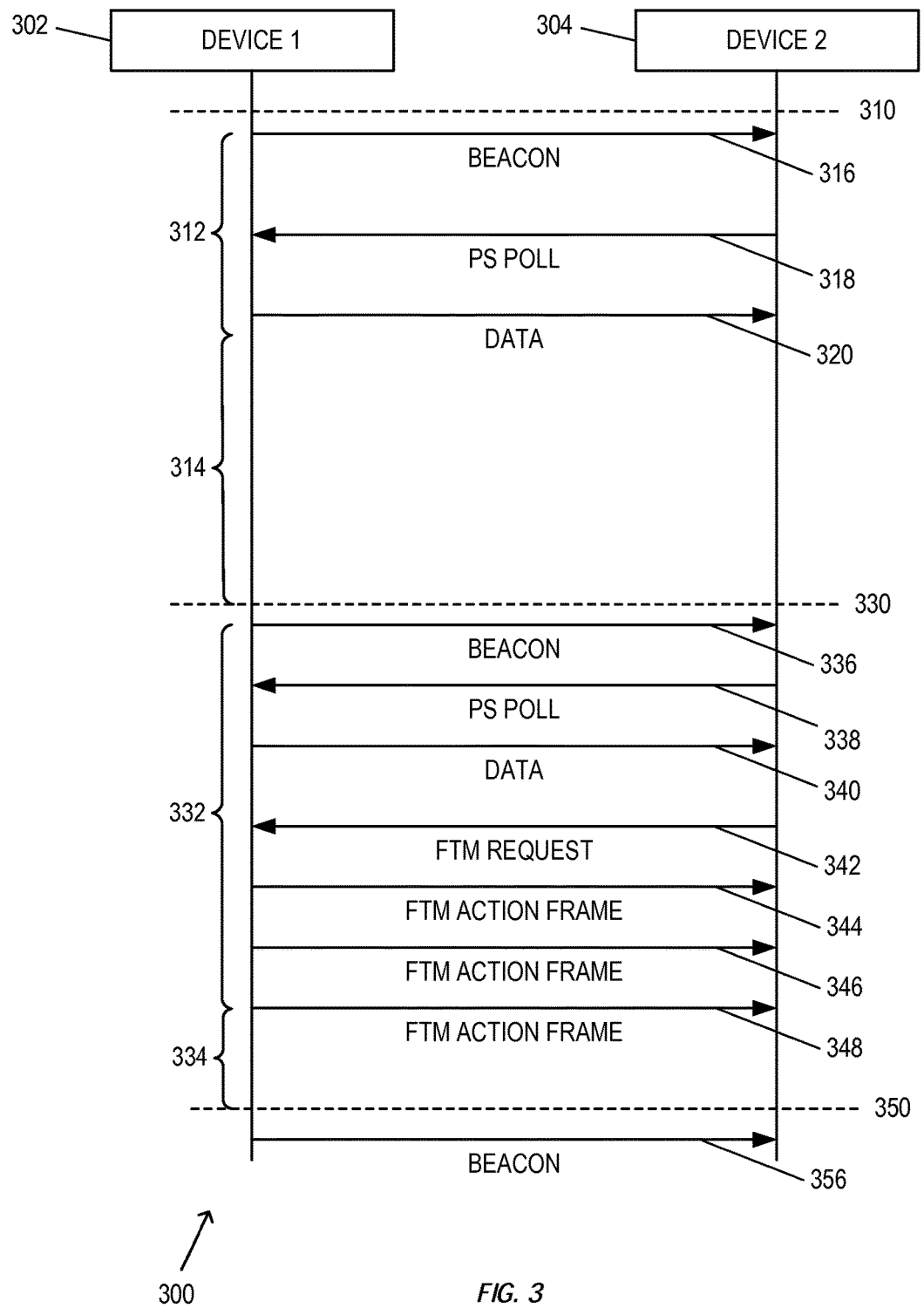
FIG. 3 is an example timing diagram illustrating two communication devices of a P2P group performing a ranging exchange, according to an embodiment.

FIG. 3 is an example timing diagram 300 illustrating two communication devices 302 and 304 of a P2P group performing a ranging exchange, according to an embodiment. In some embodiments, the first communication device 302 and the second communication device 304 are similar to the communication devices 14 and/or 25, described above with respect to FIG. 1. In other embodiments, the first communication device 302 and the second communication device 304 are other suitable communication devices.

In the embodiment illustrated in FIG. 3, the first communication device 302 is a group owner of a P2P group that includes the second communication device 304. The first communication device 302 is configured for an opportunistic power save feature allows the first communication device 302 to transition between an active or "present" state and an inactive or "doze" state, in various embodiments. During the doze state, the first communication device 302 does not respond to signals on the communication channel in order to conserve electrical power. In some embodiments, the first communication device 302 turns off or reduces electrical power consumed by or provided to one or more components of the first communication device 302, for example, the network interface 16, the controller 18, the transceiver 20, and/or the group owner control unit 28. In an embodiment, the first communication device 302 reduces power to the transceiver 20. In another embodiment, the first communication device 302 reduces power to the transceiver 20 and the group owner control unit 28. In other embodiments and/or scenarios, the first communication device 302 turns off or reduces electrical power consumed by other suitable components.

In some embodiments, the opportunistic power save feature reduces P2P device availability and therefore impacts discoverability of the P2P group. For at least this reason, the first communication device 302 uses a client traffic window (CTWindow) as an availability period to assist in maintaining discoverability of the P2P group. The CTWindow is a period during which a P2P Group Owner is in the "present" state and able to receive transmissions from members of the P2P group. In some embodiments, the first communication device 302 selects a suitable value for the CTWindow that is less than a beacon interval for the P2P group, for example, an integer number of transmission units (TU). In some embodiments, the CTWindow is selected to be at least 10 transmission units (e.g., approximately 10 milliseconds). In an embodiment, the first communication device 302 begins a CTWindow at a target beacon transmission time (TBTT) and extending such that the first communication device 302 is "present" for the selected duration.

In the embodiment illustrated in FIG. 3, the first communication device 302 transmits beacon frames 316, 336, and 356 at TBTTs 310, 330, and 350, respectively. After the TBTT 310, the first communication device 302 remains active during a CTWindow 312 and is able to respond to a power save poll (PS-Poll) request 318 and provide data 320 to the second communication device 304, in an embodiment. In the embodiment of FIG. 3, the first communication device 302 enters a doze state 314 after a duration of time corresponding to the CTWindow 312, until the next TBTT 330.

After the TBTT 330, the first communication device 302 responds to a PS-Poll request 338 and provides data 340 to the second communication device 304, in the embodiment of FIG. 3. In an embodiment, the second communication device 304 transmits a ranging request such as an FTM request 342 to the first communication device 302 during the CTWindow 312. In some embodiments, an FTM request indicates an integer number of action frames to be provided for range estimation. In the embodiment illustrated in FIG. 3, the FTM request 342 indicates that the first communication device 302 is to transmit three action frames 344, 346, and 348. The FTM request 342 indicates different numbers (e.g., 1, 2, 4, 5, 6, etc.) of action frames in various scenarios and embodiments. While not shown for clarity, in some embodiments and/or scenarios, the second communication device 304 transmits an acknowledgment for each of the action frames 344, 346, and 348.

In some embodiments and/or scenarios, the indicated number of action frames cannot be transmitted during an active state having a same duration as the CTWindow 312. In an embodiment, the first communication device 302 extends a client traffic window 332 to have a second duration that is longer than a first duration of the CTWindow 312, which effectively reduces a duration of a subsequent doze state 334. In some embodiments, the doze state 334 is omitted to allow sufficient time to handle the FTM request 342. In another embodiment, the first communication device 302 modifies (i.e., reduces) the number of action frames to be transmitted. For example, in an embodiment, the first communication device 302 transmits one or two action frames during the CTWindow 332. In yet another embodiment, the first communication device extends the duration of the CTWindow 332 and also reduces the number of action frames to be transmitted.

In an embodiment, the first communication device 302 is configured to stay awake as long as any member of the P2P group is awake. In an embodiment, the first communication device 302 determines that a P2P member is awake while a ranging exchange with the P2P member has not yet completed. In another embodiment, the first communication device 302 determines that a P2P member is in the awake state if the P2P member is in a Power Save mode and has i) a wireless multimedia (WMM) unscheduled service period (USP) in progress or ii) an unanswered PS-Poll. In an embodiment, the first communication device 302 enters the doze state 334 after completing the ranging exchange (e.g., transmission of the action frames 342, 344, and 346).

Figure 4:
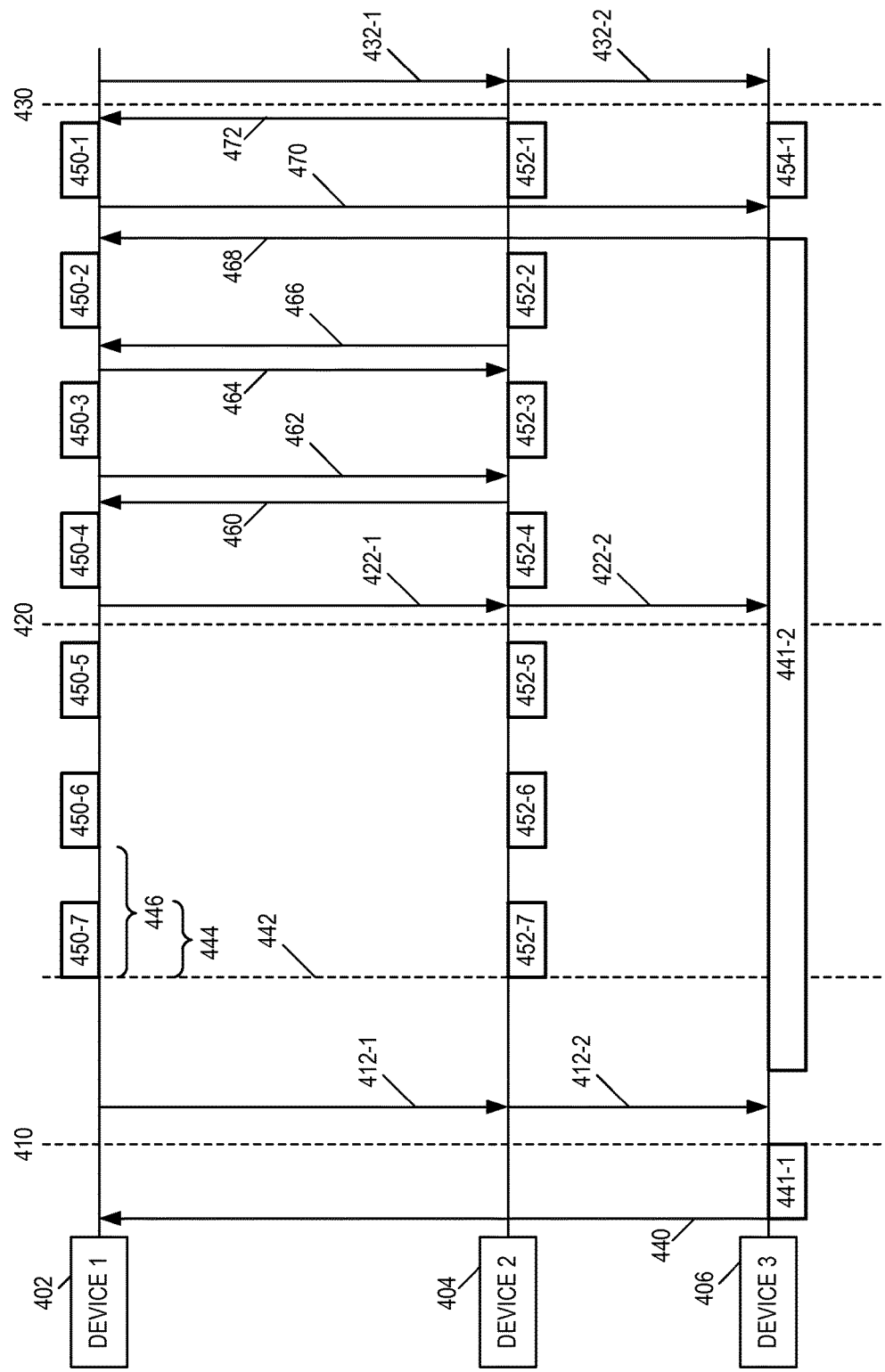
FIG. 4 is an example timing diagram illustrating first, second, and third communication devices of a P2P group performing a ranging exchange, according to an embodiment.

FIG. 4 is an example timing diagram 400 illustrating first, second, and third communication devices 402, 404, and 406 of a P2P group performing a ranging exchange, according to an embodiment. In some embodiments, the communication devices 402, 404, and 406 are similar to the communication devices 14 and/or 25, described above with respect to FIG. 1. In other embodiments, the first communication device 402, second communication device 404, and third communication device 406 are other suitable communication devices.

In the embodiment illustrated in FIG. 4, the first communication device 402 is a group owner of a P2P group that includes the second communication device 404 and the third communication device 406. In various embodiments and/or scenarios, the first communication device 402 is configured for a notice of absence power save feature. In contrast to a single transition from an active state to a doze state as in the opportunistic power save feature described above with respect to FIG. 3, the notice of absence indicates one or more "absence periods" during which the communication device does not respond to received signals (e.g., the first communication device 302 turns off or reduces consumed electrical power, as described above) but then returns to the active state prior to a subsequent TBTT.

In various embodiments, the first communication device 402 indicates a schedule or one or more timing parameters for planned timing of one or more absence periods. In various embodiments and/or scenarios, the first communication device 402 indicates the timing parameters within transmitted beacon frames, probe response frames, and/or action frames (e.g., a notice of absence action frame). In the embodiment illustrated in FIG. 4, the first communication device 402 indicates the timing parameters in beacon frames 412 and 422 which are broadcast for the second communication device 404 and third communication device 406 after TBTTs 410 and 420.

In the embodiment illustrated in FIG. 4, the third communication device 406 transmits an action frame 440 to the first communication device 402 that indicates a transition to a power save or doze state 441. In various embodiments, the third communication device 406 transmits the action frame 440 to conserve battery power, for a lack of data to be transmitted or received, or other suitable reasons. In some embodiments, the first communication device 402 determines whether to perform the notice of absence power save feature based on a number of active P2P members, whether queued or buffered data is waiting to be transmitted, or other suitable reasons. In an embodiment, the third communication device 406 transitions to an active state in order to receive the beacon frame 412 and then returns to the doze state 441.

In various embodiments, the timing parameters include one or more of a start time 442, a duration 444, an interval 446, and count (not shown). In an embodiment, for example, the start time 442 indicates a beginning of a first absence period, the duration 444 indicates a time duration of each absence period, the interval 446 indicates a time interval between adjacent absence periods, and the count indicates an integer number of absence periods. In the embodiment of FIG. 4, the count indicates seven absence periods 450. In various embodiments, the first communication device 402 updates the timing parameters for subsequently transmitted beacon frames, probe response frames, and/or action frames. In the embodiment of FIG. 4, the beacon frame 412 indicates a count of seven absence periods 450, while the beacon frame 422 indicates a count of four absence periods (i.e., remaining absence periods) and the beacon frame 432 does not include timing parameters, signaling an end of the absence periods. In an embodiment, the first communication device 402 signals additional absence periods using subsequent beacon frames, probe response frames, and/or action frames.

In some embodiments, the second communication device 404 transitions to a doze state 452 in response to the timing parameters received from the first communication device 402. In an embodiment, for example, the second communication device 404 schedules seven doze states 452 corresponding in time to the seven absence periods 450 to reduce its own electrical power consumption. In an embodiment, the second communication device 404 schedules action frames 460, 466, and 472 to request data frames 462 and 464 from the first communication device 402 while avoiding the absence periods 450. In an embodiment, the third communication device 406 uses the timing parameters received from the beacon frame 412 to schedule an action frame 468 to request data frames 472 from the first communication device 402 while avoiding the absence periods 450.

In an embodiment, the second communication device 404 transmits a ranging request to the first communication device 402 during the notice of absence power save feature. In an embodiment, the second communication device 404 selects timing parameters for the ranging request such that the corresponding action frames avoid the absence periods 450. In another embodiment, in response to a ranging request that indicates an overlap with the absence periods 450, the first communication device 402 modifies one or more timing parameters of the ranging request to avoid the absence periods 450. In another embodiment, in response to a ranging request that indicates an overlap with the absence periods 450, the first communication device 402 rejects or ignores the ranging request.

Figure 5:
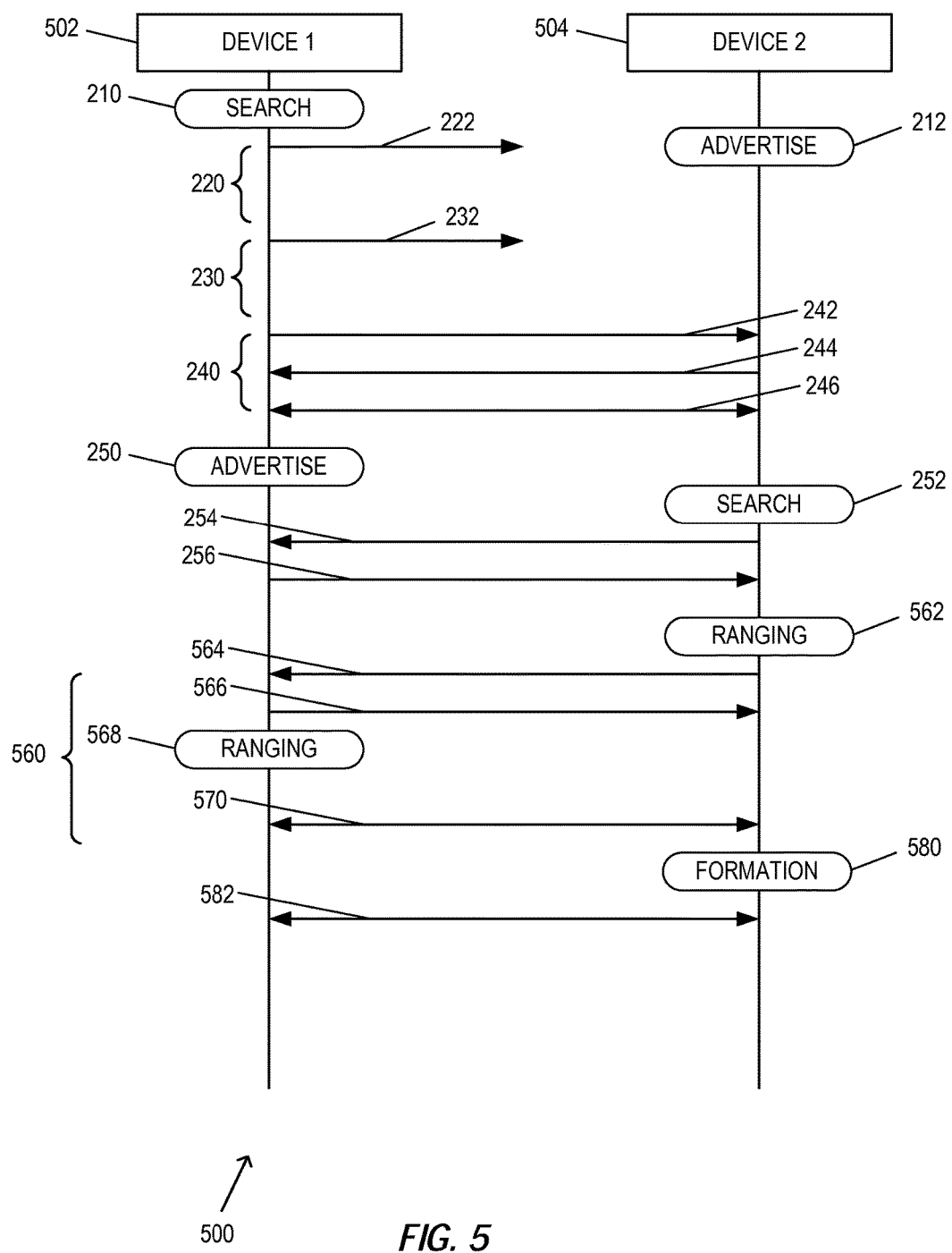
FIG. 5 is an example timing diagram illustrating two communication devices performing a ranging exchange before formation of a P2P group, according to an embodiment.

FIG. 5 is an example timing diagram 500 illustrating two communication devices, a first communication device 502 and a second communication device 504, performing a ranging exchange 560 before formation of a P2P group, according to an embodiment. In some embodiments, the first communication device 502 and the second communication device 504 are similar to the communication devices 14 and/or 25, described above with respect to FIG. 1. In other embodiments, the first communication device 502 and the second communication device 504 are other suitable communication devices.

In the embodiment illustrated in FIG. 2, the communication devices 202 and 204 did not perform a range measurement prior to association to form the P2P group. In contrast, FIG. 5 illustrates a scenario where range measurement can be used for peer device selection. Accordingly, the second communication device 504 performs the ranging exchange 560 without joining a P2P group, in various embodiments. The embodiment illustrated in FIG. 2 includes initial steps, prior to performing the ranging exchange 560, for the search state 210, advertise state 212, advertise state 250, and search state 252 which are similar to those described above with respect to FIG. 2, and so the corresponding description are not repeated. In an embodiment, the service discovery exchange 246 is also performed prior to performing the ranging exchange 560. In an embodiment, the advertise state 250 and search state 252 are omitted. For example, in one such embodiment, the first communication device 502 and the second communication device 504 perform steps for the search state 210 and advertise state 212, followed by the service discovery exchange 246 and the ranging exchange 560.

In the embodiment illustrated in FIG. 5, the second communication device 504 initiates the ranging exchange 560 within the search state 252 by entering a ranging state 562. In the ranging state 562, the second communication device 504 transmits a ranging request 564 to the first communication device 502, in an embodiment. In some embodiments, the ranging request 564 is a timing measurement request frame. In response to the ranging request 564, the first communication device 502 transmits an acknowledgment frame 566 to the second communication device 504, in an embodiment. In some embodiments, the first communication device 502 omits the acknowledgment frame 566. In an embodiment, the second communication device 704 maintains the search state 252 and ranging state 562 on the first channel until an end of the ranging exchange 560.

The first communication device 502 enters a ranging state 568 in response to the ranging request 564, in an embodiment. During the ranging state 568, the first communication device 502 transmits an action frame 570 or other suitable FTM response. In some embodiments, the first communication device 502 and second communication device 504 perform additional FTM measurements, as described above with respect to FIG. 2.

In some embodiments, the second communication device 504 estimates a range to the first communication device 502 based on timing information for the action frames and acknowledgments, as further described below with respect to FIG. 7. Upon estimating the range, the communication device 504 can determine whether to transition to a formation state 580. During the formation state 580, the first communication device 582 and second communication device 504 exchange messages 582 for group formation as described above in formation state 260 of FIG. 2.

Figure 6:
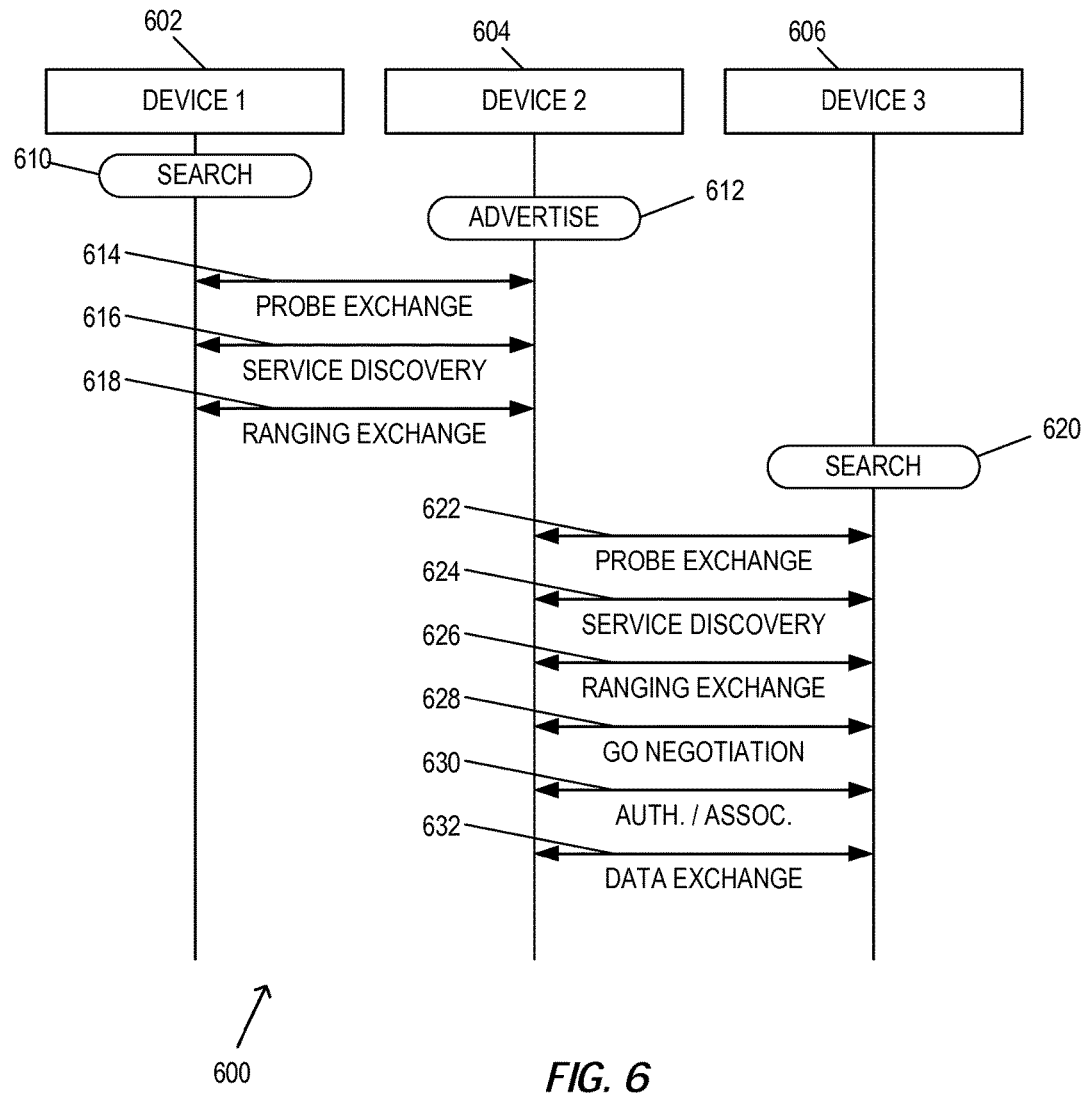
FIG. 6 is an example timing diagram illustrating three communication devices performing ranging exchanges before formation of a P2P group, according to an embodiment.

FIG. 6 is an example timing diagram 600 illustrating first, second, and third communication devices 602, 604, and 606 performing ranging exchanges before formation of a P2P group, according to an embodiment. In some embodiments, the communication devices 602, 604, and 606 are similar to the communication devices 14 and/or 25, described above with respect to FIG. 1. In other embodiments, the first communication device 602, the second communication device 604, and the third communication device 606 are other suitable communication devices.

In the embodiment illustrated in FIG. 6, the first communication device 602 is in a search state 610 while the second communication device 604 is in an advertise state 612. The first communication device 602 and second communication device 604 perform a probe exchange 614, a service discovery exchange 616, and ranging exchange 618. In an embodiment, the probe exchange 614 includes the probe request 242 and probe response 244, as described above with respect to FIG. 2. In an embodiment, the service discovery exchange 616 is an exchange of one or more communication frames that indicate a device type, PHY and/or MAC layer capabilities, service capabilities, and/or other suitable information. In an embodiment, the ranging exchange 618 includes the FTM request 272, the FTM response 274, and the FTM measurement 276, as described above with respect to FIG. 2. In the example of FIG. 6, the first communication device 602 is not within a suitable range and a group formation is not performed. In this example, the third communication device 606 is in a search state 620.

The second communication device 604, still in the advertise state 612, and the third communication device 606 in the search state 620 perform a probe exchange 622, service discovery exchange 624, and ranging exchange 626, similarly to the probe exchange 614, service discovery exchange 616, and ranging exchange 618. In the example illustrated in FIG. 6, the third communication device 606 is within a suitable range and performs a group ownership negotiation 628 and authentication and association 630 with the second communication device 604 to form a P2P group, in an embodiment. After formation of the P2P group, the second communication device 604 and third communication device 606 can perform a data exchange 632 using the desired service.

Figure 7:
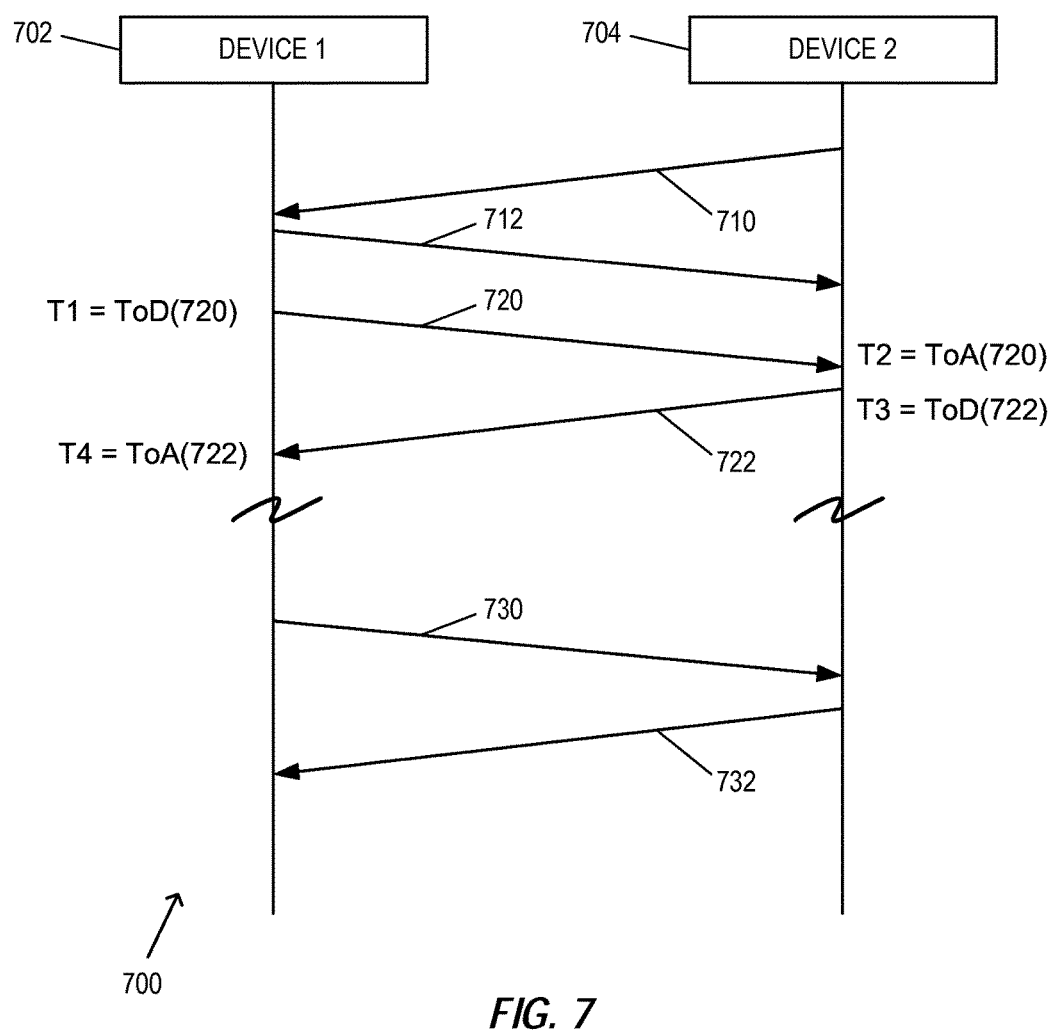
FIG. 7 is an example timing diagram illustrating two communication devices performing a ranging exchange, according to an embodiment.

FIG. 7 is an example timing diagram 700 illustrating two communication devices, a first communication device 702 and a second communication device 704, performing a ranging exchange or FTM negotiation, according to an embodiment. In some embodiments, the first communication device 702 and the second communication device 704 are similar to the communication devices 14 and/or 25, described above with respect to FIG. 1. In other embodiments, the first communication device 702 and the second communication device 704 are other suitable communication devices.

In the embodiment illustrated in FIG. 7, the second communication device 704 transmits a ranging request 710 to the first communication device 702. In an embodiment, the ranging request 710 is a fine timing measurement request. In some embodiments, the ranging request 710 includes a request for "as soon as possible" processing by the first communication device 702. In response to the ranging request 710, the first communication device 702 transmits an acknowledgment to the second communication device 704. In another embodiment, the first communication device 702 omits the acknowledgment 712.

In response to the ranging request 710, the first communication device 702 transmits an action frame 720 and stores a departure time indicator (T1) or "time of departure" for the corresponding transmission, in an embodiment. The second communication device 704 receives the action frame 720 and stores an arrival time indicator T2 or "time of arrival" for the corresponding reception. In some embodiments, the departure time indicator and arrival time indicator are timestamps. In other embodiments, the departure time indicator and arrival time indicator are counter values for a time synchronization function (TSF).

In response to the action frame 720, the second communication device 704 transmits an acknowledgment 722 and stores a departure time indicator T3 for the corresponding transmission, in an embodiment. The first communication device 702 receives the acknowledgment 722 and stores an arrival time indicator T4 for the corresponding reception, in an embodiment. In response to receipt of the acknowledgment 722, the first communication device 702 transmits an action frame 730 to the second communication device 704 that includes the departure time indicator T1 and the arrival time indicator T4, in an embodiment. The second communication device 704 transmits an acknowledgment 732 in response to the action frame 730, in an embodiment. In an embodiment, the second communication device 704 estimates a round trip time RTT as:

$$RTT=(T4-T1)-(T3-T2) \qquad \text{(Equ. 1)}$$

In an embodiment, the second communication device 704 estimates time offset $T_{offset}$ between the first communication device 702 and the second communication device 704 as:

$$T_{offset}=((T2-T1)-(T4-T3))/2 \qquad \text{(Equ. 2)}$$

In an embodiment, the first communication device 702 transmits the action frames in overlapping pairs. In an embodiment, for example, the first action frame 720 includes a nonzero dialog token and the second action frame 730 includes a follow up dialog token set to the value of the dialog token of the first action frame 720. In an embodiment, the second communication device 704 uses a TSF time in a successful probe response immediately before the ranging exchange as a reference time of a partial TSF timer field for the FTM negotiation. In an embodiment, the partial TSF timer field uses the TSF time of the communication device that transmits the FTM response frame as the reference time, such as the TSF time of the communication device 702 that sends the action frame 720. In another embodiment, the partial TSF time field uses the TSF time of a communication device having a higher MAC address as the reference time.

In various embodiments, the second communication device 704 uses the round trip time RTT to estimate a distance to the first communication device 702. In an embodiment, the second communication device 704 compares the round trip time RTT to a threshold range for time, such as 20 milliseconds, 40 milliseconds, or other suitable values. In another embodiment, the second communication device 704 converts the round trip time RTT to a distance estimate by multiplying with a speed of the radio signals for a "time of flight" calculation. In an embodiment, the second communication device 704 synchronizes a local clock with the first communication device 702 based on the time offset $T_{offset}$, for example, using procedures as defined in the IEEE 802.1AS standard.

Figure 8:
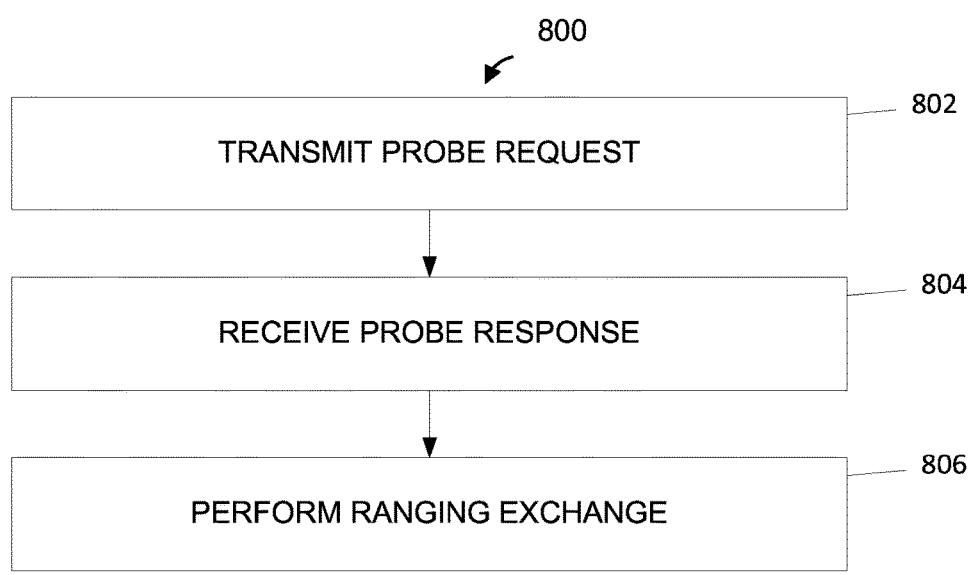
FIG. 8 is a flow diagram of an example method for discovering devices in a peer to peer (P2P) wireless communication network, according to an embodiment.

FIG. 8 is a flow diagram of an example method 800 for discovering devices in a peer to peer (P2P) wireless communication network, according to an embodiment. With reference to FIG. 1, the method 800 is implemented by the network interface 16, in an embodiment. According to another embodiment, the controller 18 is also configured to implement at least a part of the method 800. With continued reference to FIG. 1, in yet another embodiment, the method 800 is implemented by the network interface 34. In other embodiments, the method 800 is implemented by other suitable network interfaces.

At block 802, during a search state of a first communication device, a probe request is transmitted on a first channel included in a plurality of channels by the first communication device, in an embodiment. In an embodiment, the first communication device selects the first channel from a plurality of social channels. In an embodiment, the first communication device sends a probe request 242 in the search state 210, as described above with respect to FIG. 2.

At block 804, during the search state, the first communication device receives a probe response transmitted by a second communication device on the first channel, in an embodiment. In an embodiment, for example, the first probe request is the probe request 242 and the probe response is the probe response 244, as described above with respect to FIG. 2. In another embodiment, the first probe request is the probe request 254 and the probe response is the probe response 256, as described above with respect to FIG. 2.

At block 806, in response to the probe response, the first communication device performs a ranging exchange with the second communication device, in an embodiment. In an embodiment, for example, the ranging exchange is similar to the ranging exchange 270 as described above with respect to FIG. 2, or the ranging exchange 560 as described above with respect to FIG. 5.

Figure 9:
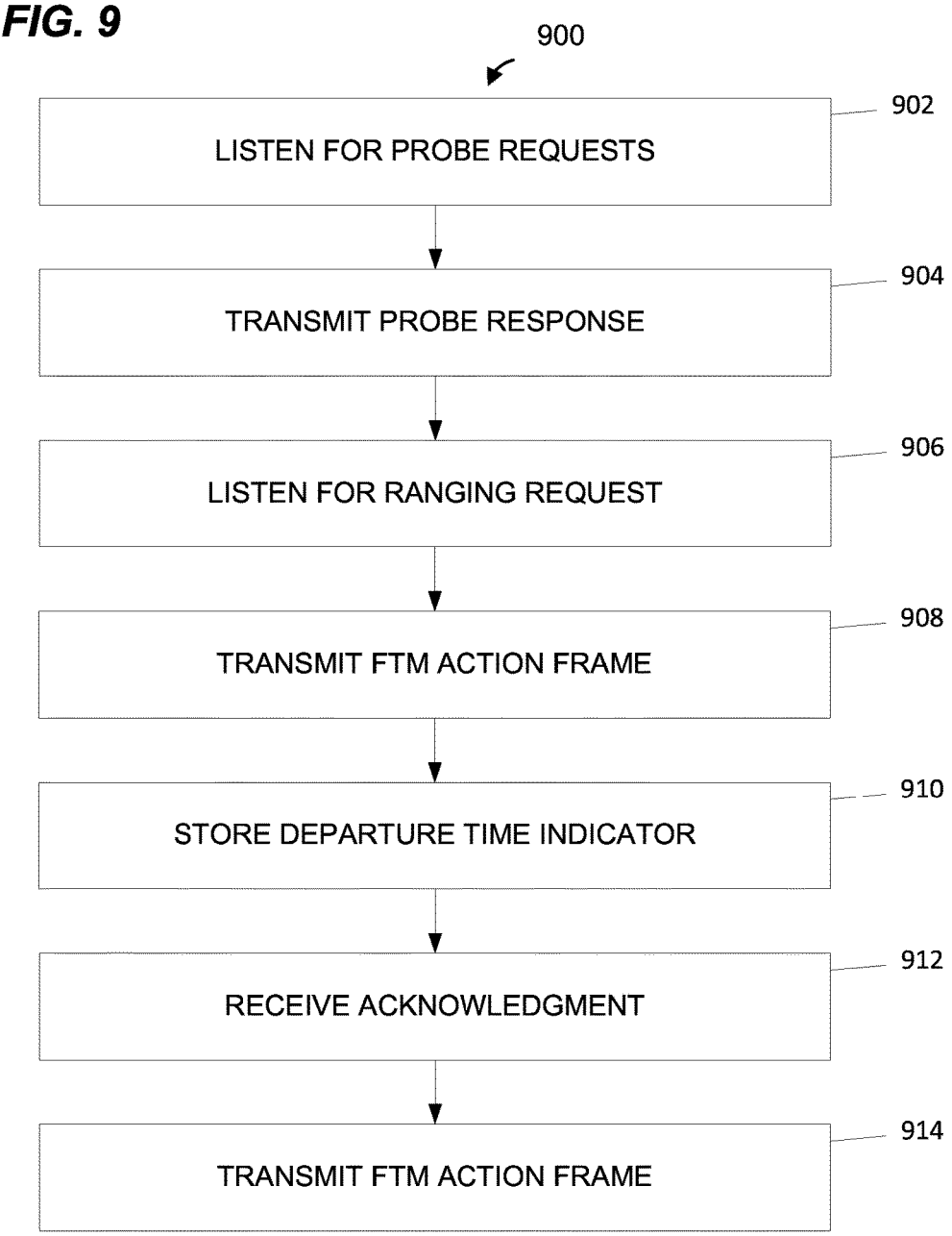
FIG. 9 is a flow diagram of an example method for discovering devices in a peer to peer (P2P) wireless communication network, according to an embodiment.

FIG. 9 is a flow diagram of an example method 900 for discovering devices in a peer to peer (P2P) wireless communication network, according to an embodiment. With reference to FIG. 1, the method 900 is implemented by the network interface 16, in an embodiment. According to another embodiment, the controller 18 is also configured to implement at least a part of the method 900. With continued reference to FIG. 1, in yet another embodiment, the method 900 is implemented by the network interface 34. In other embodiments, the method 900 is implemented by other suitable network interfaces.

At block 902, during an advertise state of a first communication device, the first communication device listens for probe requests on a first channel included in a plurality of channels, in an embodiment. In some embodiments, the first communication device selects the first channel from a plurality of social channels. In an embodiment, the advertise state is the advertise state 212 and the first communication device listens for the probe request 242 as described above with respect to FIG. 2.

At block 904, during the advertise state the first communication device transmits a probe response to a first probe request transmitted by a second communication device on the first channel if the first probe request is received on the first channel during the advertise state, in an embodiment. In an embodiment, for example, the first probe request is the probe request 242 and the probe response is the probe response 244, as described above with respect to FIG. 2. In another embodiment, the first probe request is the probe request 254 and the probe response is the probe response 256, as described above with respect to FIG. 2.

At block 906, during the advertise state and in response to the first probe request, the first communication device listens for probe requests on the first channel and for a ranging request transmitted by the second communication device, in an embodiment. For example, the first communication device listens for the ranging request 564, as described above with respect to FIG. 5.

At block 908, during the advertise state and in response to the ranging request, the first communication device transmits a first action frame having a dialog token for a fine timing measurement exchange, in an embodiment. In an embodiment, for example, the first action frame is the action frame 570 or action frame 720.

At block 912, the first communication device stores a departure time indicator for the first action frame, in an embodiment. In an embodiment, for example, the departure time indicator is the time of departure T1 for the action frame 720, as described above with respect to FIG. 7.

At block 914, during the advertise state and in response to an acknowledgment to the first action frame transmitted by the second communication device, the first communication device transmits a second action frame that indicates the departure time indicator for the first action frame and an arrival time indicator of the acknowledgment of the first action frame, in an embodiment. In an embodiment, for example, the acknowledgment is the acknowledgment 722 and the second action frame is the action frame 730, as described above with respect to FIG. 7.

Figure 10:
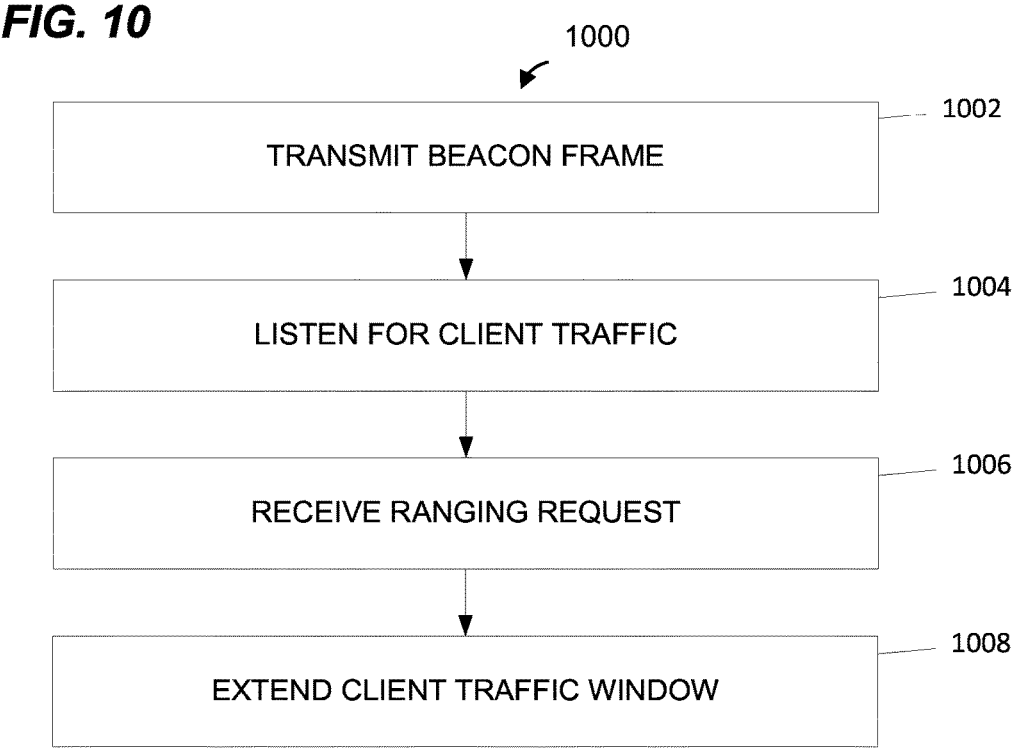
FIG. 10 is a flow diagram of an example method for performing range estimation between devices in a P2P wireless communication network, according to an embodiment.

FIG. 10 is a flow diagram of an example method 1000 for performing range estimation between devices in a P2P wireless communication network, according to an embodiment. With reference to FIG. 1, the method 1000 is implemented by the network interface 16, in an embodiment. According to another embodiment, the controller 18 is also configured to implement at least a part of the method 1000. With continued reference to FIG. 1, in yet another embodiment, the method 1000 is implemented by the network interface 34. In other embodiments, the method 1000 is implemented by other suitable network interfaces.

At block 1002, during an active state of a first communication device, the first communication device transmits a beacon for a P2P group, in an embodiment. The beacon indicates a client traffic window having a first duration for the active state, in an embodiment. In an embodiment, for example, the beacon is the beacon frame 336, as described above with respect to FIG. 3.

At block 1004, during the active state, the first communication device listens for client traffic of the P2P group, in an embodiment. In an embodiment, for example, the first communication device listens for a PS-poll frame 338 as described above with respect to FIG. 3, a data request 460, 466, 468, or 472 as described above with respect to FIG. 4, or other suitable client traffic.

At block 1006, during the active state, the first communication device receives a ranging request transmitted by a second communication device of the P2P group, in an embodiment. In an embodiment, for example, the ranging request is the ranging request 272 as described above with respect to FIG. 2, or the ranging request 342 as described above with respect to FIG. 3.

At block 1008, in response to the ranging request, the first communication device extends the client traffic window to have a second duration that is longer than the first duration, in an embodiment. In an embodiment, the first communication device extends the client traffic window 332 to have a sufficient duration to include the FTM action frames 344, 346, and 348, as described above with respect to FIG. 3.

Figure 11:
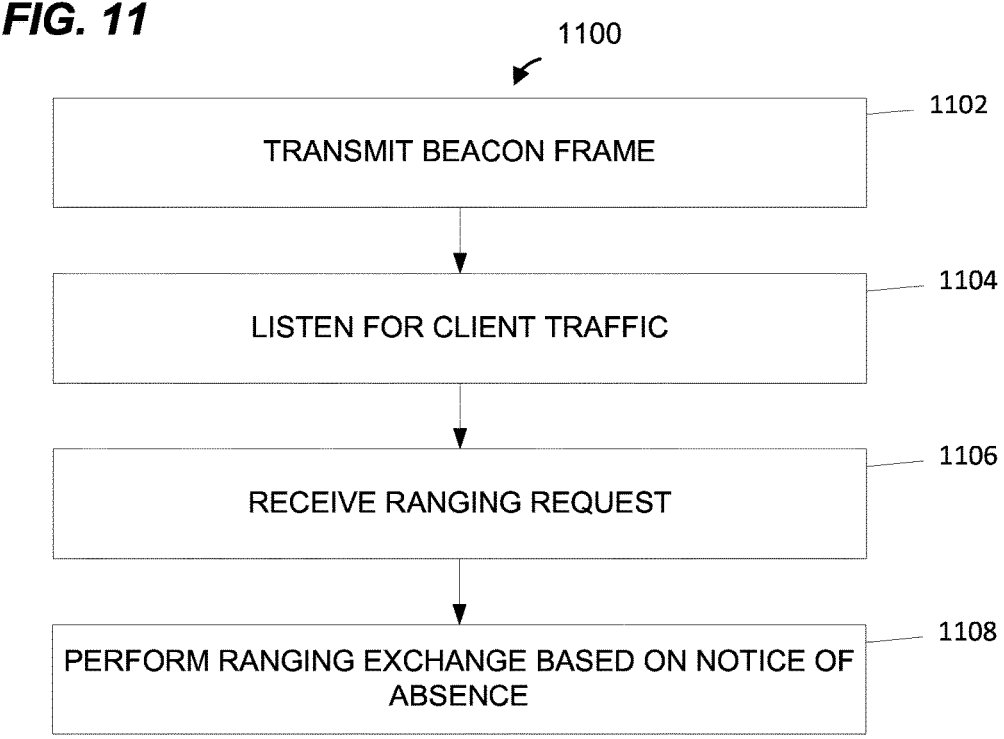
FIG. 11 is a flow diagram of an example method for performing range estimation between devices in a P2P wireless communication network, according to an embodiment.

FIG. 11 is a flow diagram of an example method 1100 for performing range estimation between devices in a P2P wireless communication network, according to an embodiment. With reference to FIG. 1, the method 1100 is implemented by the network interface 16, in an embodiment. According to another embodiment, the controller 18 is also configured to implement at least a part of the method 1100. With continued reference to FIG. 1, in yet another embodiment, the method 1100 is implemented by the network interface 34. In other embodiments, the method 1100 is implemented by other suitable network interfaces.

At block 1102, during an active state of a first communication device, the first communication device transmits a beacon for a P2P group, in an embodiment. The beacon indicates a notice of absence for the first communication device, in an embodiment. In an embodiment, the beacon is the beacon frame 412 or beacon frame 422, as described above with respect to FIG. 4.

At block 1104, during the active state, the first communication device listens for client traffic of the P2P group, in an embodiment. In an embodiment, for example, the first communication device listens for a PS-poll frame 338 as described above with respect to FIG. 3, a data request 460, 466, 468, or 472 as described above with respect to FIG. 4, or other suitable client traffic.

At block 1106, during the active state, the first communication device receives a ranging request transmitted by a second communication device of the P2P group, in an embodiment. In an embodiment, for example, the ranging request is the ranging request 272 as described above with respect to FIG. 2, or the ranging request 342 as described above with respect to FIG. 3.

At block 1108, in response to the ranging request, the first communication device performs a ranging exchange with the second communication device based on the notice of absence, in an embodiment. In an embodiment, for example, the ranging exchange is similar to the ranging exchange 270 as described above with respect to FIG. 2, or the ranging exchange 560 as described above with respect to FIG. 5.

In an embodiment, a method for performing range estimation between devices in a peer to peer (P2P) wireless communication network includes: during an active state of a first communication device, transmitting, by the first communication device, a beacon for a P2P group, the beacon indicating a client traffic window having a first duration for the active state; during the active state, listening, by the first communication device, for client traffic of the P2P group; during the active state, receiving, by the first communication device, a ranging request transmitted by a second communication device of the P2P group; and in response to the ranging request, extending the client traffic window to have a second duration that is longer than the first duration.

In other embodiments, the method further includes any suitable combination of one or more of the following features.

The method further comprises, during the active state and in response to the ranging request, performing, by the first communication device, a ranging exchange with the second communication device.

The method further comprises transitioning to a doze state upon completion of the ranging exchange with the second communication device.

In another embodiment, a method for performing range estimation between devices in a peer to peer (P2P) wireless communication network includes: during an active state of a first communication device, transmitting, by the first communication device, a beacon for a P2P group, the beacon indicating a notice of absence for the first communication device; during the active state, listening, by the first communication device, for client traffic of the P2P group; during the active state, receiving, by the first communication device, a ranging request transmitted by a second communication device of the P2P group; and in response to the ranging request, performing a ranging exchange with the second communication device based on the notice of absence.

In other embodiments, the method further includes any suitable combination of one or more of the following features.

The ranging request includes one or more timing parameters for the ranging exchange; and performing the ranging exchange comprises performing the ranging exchange using the one or more timing parameters including at least one modified timing parameter of the one or more timing parameters.

Performing the ranging exchange comprises modifying a start time of the one or more timing parameters to avoid absence periods corresponding to the notice of absence.

Performing the ranging exchange comprises modifying an action frame interval of the one or more timing parameters to avoid absence periods corresponding to the notice of absence.

In various embodiments, methods described above are implemented by a network interface device (e.g., the network interface device 16, the network interface 34, or another suitable network interface device) that is configured to perform various acts. In some embodiments, the network interface device comprises one or more integrated circuits.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable medium, or media, such as a magnetic disk, an optical disk, a random access memory (RAM), a read only memory (ROM), a flash memory, a memory of a processor, a tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for discovering devices in a peer to peer (P2P) wireless communication network, the method comprising:

during a search state of a first communication device, transmitting, by the first communication device, a first probe request on a first channel included in a plurality of channels, wherein the search state (i) is one of a plurality of different states in which the first communication device is configured to operate, and (ii) corresponds to a contiguous time period in which the first communication device is configured to transmit multiple probe requests on different channels among the plurality of channels;

during the search state, receiving, by the first communication device, a first probe response transmitted by a second communication device on the first channel;

in response to receiving the first probe response, performing, by the first communication device, a ranging exchange with the second communication device;

during an advertise state of the first communication device, listening, by the first communication device, for probe requests on a second channel included in the plurality of channels, wherein the advertise state corresponds to another contiguous time period in which the first communication device is configured to listen for probe requests on a single channel, and wherein a duration of the other contiguous time period is randomly or pseudo-randomly determined by the first communication device;

during the advertise state, transmitting, by the first communication device, a second probe response to a second probe request transmitted by a third communication device on the second channel if the second probe request is received on the second channel during the advertise state;

during the advertise state and in response to the second probe request, listening, by the first communication device, for probe requests on the second channel and for a ranging request transmitted by the third communication device; and during the advertise state and in response to the ranging request transmitting, by the first communication device, a first action frame having a dialog token for a fine timing measurement exchange, and storing, by the first communication device, a first departure time indicator for the first action frame.

2. The method of claim 1, wherein the first communication device performs the ranging exchange without first joining a P2P group with the second communication device.

3. The method of claim 1, wherein performing the ranging exchange comprises performing the ranging exchange during the search state of the first communication device on the first channel.

4. The method of claim 3, further comprising maintaining, by the first communication device, the search state of the first communication device on the first channel until an end of the ranging exchange.

5. The method of claim 1, further comprising:
determining, by the first communication device, whether the second communication device is within a threshold range based on the ranging exchange; and in response to a determination that the second communication device is within the threshold range, performing, by the first communication device, a group formation procedure to form a P2P group with the second communication device.

6. The method of claim 5, wherein performing the ranging exchange comprises:
transmitting, by the first communication device, a ranging request to the second communication device;
storing, by the first communication device, a first arrival time indicator that corresponds to a second action frame transmitted by the second communication device in response to the ranging request transmitted by the first communication device;

transmitting, by the first communication device, an acknowledgment to the second action frame;

storing, by the first communication device, a second departure time indicator for the acknowledgement to the second action frame; and in response to a third action frame transmitted by the second communication device, estimating, by the first communication device, a round trip time between the first communication device and the second communication device based on i) the first arrival time indicator, ii) a third departure time indicator that corresponds to the second action frame, iii) a second arrival time indicator that corresponds to the acknowledgment to the second action frame, and iv) the second departure time indicator, the third action frame including the third departure time indicator and the second arrival time indicator.

7. The method of claim 6, wherein:
the first arrival time indicator has a value T2, the third departure time indicator has a value T1, the second arrival time indicator has a value T4, and the second departure time indicator has a value T3, and
estimating the round trip time comprises determining the round trip time as:

$$(T4-T1)-(T3-T2).$$

8. The method of claim 6, wherein performing the ranging exchange comprises setting a reference time for the ranging exchange based on a timing synchronization function value that corresponds to the first probe response.

9. The method of claim 1, further comprising:
during the advertise state and in response to an acknowledgment to the first action frame transmitted by the third communication device, transmitting, by the first communication device, a second action frame that indicates the first departure time indicator for the first action frame and an arrival time indicator of the acknowledgment of the first action frame.

10. The method of claim 1, wherein:
the ranging request includes one or more timing parameters for the ranging exchange; and
transmitting the first action frame comprises:
modifying at least one of the one or more timing parameters to avoid absence periods of the first communication device, and
transmitting the first action frame using the one or more timing parameters including the at least one modified timing parameter.

11. The method of claim 10, wherein modifying the at least one of the one or more timing parameters comprises modifying a start time of the one or more timing parameters to avoid the absence periods.

12. The method of claim 10, wherein modifying the at least one of the one or more timing parameters comprises modifying an action frame interval of the one or more timing parameters to avoid the absence periods.

13. A first communication device, comprising:
a network interface device configured to:
during a search state of a first communication device, transmit a first probe request on a first channel included in a plurality of channels, wherein the search state (i) is one of a plurality of different states in which the first communication device is configured to operate, and (ii) corresponds to a contiguous time period in which the first communication device is configured to transmit multiple probe requests on different channels among the plurality of channels, during the search state, receive a first probe response transmitted by a second communication device on the first channel, in response to the received first probe response, perform a ranging exchange with the second communication device, during an advertise state of the first communication device, listen for probe requests on a second channel included in the plurality of channels, wherein the advertise state corresponds to another contiguous time period in which the first communication device is configured to listen for probe requests on a single channel, and wherein a duration of the other contiguous time period is randomly or pseudo-randomly determined by the first communication device, during the advertise state, transmit a second probe response to a second probe request transmitted by a third communication device on the second channel if the second probe request is received on the second channel during the advertise state, during the advertise state and in response to the second probe request, listen for probe requests on the second channel and for a ranging request transmitted by the third communication device, and during the advertise state and in response to the ranging request i) transmit a first action frame having a dialog token for a fine timing measurement exchange, and ii) store a first departure time indicator for the first action frame.

14. The first communication device of claim 13, wherein the network interface device is configured to:

perform the ranging exchange without first joining a peer-to-peer group with the second communication device.

15. The first communication device of claim 13, wherein the network interface device is configured to:

perform the ranging exchange during the search state of the first communication device on the first channel.

16. The first communication device of claim 15, wherein the network interface device is further configured to:

maintain the search state of the first communication device on the first channel until an end of the ranging exchange.

17. The first communication device of claim 13, wherein the network interface device is further configured to:

determine whether the second communication device is within a threshold range based on the ranging exchange; and in response to a determination that the second communication device is within the threshold range, perform a group formation procedure to form a peer-to-peer (P2P) group with the second communication device.

18. The first communication device of claim 13, wherein the network interface device is further configured to:

during the advertise state and in response to an acknowledgment to the first action frame transmitted by the third communication device, transmit a second action frame that indicates the first departure time indicator for the first action frame and an arrival time indicator of the acknowledgment of the first action frame.

19. The first communication device of claim 13, wherein:

the ranging request includes one or more timing parameters for the ranging exchange; and the network interface device is configured to modify at least one of the one or more timing parameters to avoid absence periods of the first communication device, and transmit the first action frame using the one or more timing parameters including the at least one modified timing parameter.

20. The first communication device of claim 19, wherein the network interface device is configured to modify a start time of the one or more timing parameters to avoid the absence periods.

21. The first communication device of claim 19, wherein the network interface device is configured to modify an action frame interval of the one or more timing parameters to avoid the absence periods.

* * * * *